(12) United States Patent
Thorsen

(10) Patent No.: US 7,828,157 B2
(45) Date of Patent: Nov. 9, 2010

(54) STEERING WHEEL STAND FOR ELECTRONIC GAME CONTROL

(76) Inventor: Michael L Thorsen, 870 S. Ehrenberg Rd., Golden Valley, AZ (US) 86413

(*) Notice: Subject to any disclaimer, the term of this patent is extended or adjusted under 35 U.S.C. 154(b) by 1457 days.

(21) Appl. No.: 11/224,292

(22) Filed: Sep. 13, 2005

(65) Prior Publication Data

US 2006/0111181 A1    May 25, 2006

Related U.S. Application Data

(60) Provisional application No. 60/630,239, filed on Nov. 24, 2004.

(51) Int. Cl.
*A47F 7/00* (2006.01)
(52) U.S. Cl. .................................... 211/26.2
(58) Field of Classification Search ............... 211/26.2, 211/26, 26.1, 13.1; D21/324, 325; 482/8; 248/125.9, 130; 273/309; 108/43; 463/46, 463/36
See application file for complete search history.

(56) References Cited

U.S. PATENT DOCUMENTS

| | | |
|---|---|---|
| 4,276,030 A | 6/1981 | Radice |
| 4,422,640 A | 12/1983 | Tamarkin |
| 4,494,754 A | 1/1985 | Wagner |
| 4,494,755 A | 1/1985 | Caillouet |
| 4,573,682 A | 3/1986 | Mayon |
| 4,630,823 A | 12/1986 | Grant |
| 4,852,499 A | 8/1989 | Ozols |
| 4,949,119 A * | 8/1990 | Moncrief et al. ............... 703/8 |
| 5,207,791 A | 5/1993 | Scherbarth |
| 5,417,168 A * | 5/1995 | Soper ........................ 108/124 |
| D361,452 S | 8/1995 | Neylon |
| D376,186 S | 12/1996 | Penney |
| 5,655,736 A | 8/1997 | Kozloff |
| 5,690,582 A * | 11/1997 | Ulrich et al. .................... 482/4 |
| 5,766,079 A * | 6/1998 | Kataoka et al. ............... 463/36 |
| 5,771,613 A * | 6/1998 | Geils et al. ............... 38/102.21 |
| 5,829,745 A | 11/1998 | Houle |
| 5,857,986 A * | 1/1999 | Moriyasu ..................... 601/49 |
| 5,885,080 A * | 3/1999 | Letovsky ..................... 434/62 |
| 5,911,634 A | 6/1999 | Nidata |
| 5,951,018 A * | 9/1999 | Mamitsu ..................... 273/442 |
| 5,989,123 A | 11/1999 | Tosaki |
| 6,033,014 A * | 3/2000 | Nightengale ............ 297/174 R |

(Continued)

FOREIGN PATENT DOCUMENTS

FR    2838314    10/2003

*Primary Examiner*—Sarah Purol
(74) *Attorney, Agent, or Firm*—Richard C. Litman

(57) ABSTRACT

The steering wheel stand for an electronic game control is an apparatus for supporting a game controller having a steering wheel. The stand supports the game controller in a manner that simulates the driving experience. The steering wheel stand includes a frame made of hollow tubing, which rests on a pair of base legs. The base legs bend toward the user at one end, and contact the surface on which the user is seated, at the opposite end. The frame is telescopically adjustable to allow for users of different sizes. The base legs also support a pedal plate for the placement of a video game's pedal controls. The pedal plate may be vertically adjusted to accommodate users of different leg lengths. The steering wheel controls sit on a tray on top of the frame in front of the user.

13 Claims, 6 Drawing Sheets

U.S. PATENT DOCUMENTS

| | | | |
|---|---|---|---|
| 6,039,392 A * | 3/2000 | Dencker | 297/172 |
| 6,044,772 A * | 4/2000 | Gaudette et al. | 108/43 |
| D427,789 S * | 7/2000 | Hill | |
| 6,083,106 A * | 7/2000 | McDowell | 463/46 |
| D434,086 S * | 11/2000 | Ford | D21/328 |
| 6,251,015 B1 * | 6/2001 | Caprai | 463/36 |
| 6,279,906 B1 * | 8/2001 | Sanderson et al. | 273/148 B |
| 6,290,228 B1 | 9/2001 | Roberts | |
| D460,760 S * | 7/2002 | Whitehorn et al. | D14/419 |
| 6,568,334 B1 * | 5/2003 | Gaudette et al. | 108/43 |
| 6,611,250 B1 * | 8/2003 | Prince et al. | 345/163 |
| 6,663,058 B1 * | 12/2003 | Peterson et al. | 248/125.9 |
| 6,733,293 B2 * | 5/2004 | Baker et al. | 434/55 |
| 6,776,104 B2 * | 8/2004 | Herbst | 108/25 |
| D510,391 S * | 10/2005 | Merril et al. | D21/324 |
| D514,627 S * | 2/2006 | Merril et al. | D21/324 |
| 7,121,982 B2 * | 10/2006 | Feldman | 482/8 |
| 7,156,026 B2 * | 1/2007 | McClellion | 108/43 |
| D544,923 S * | 6/2007 | Brase et al. | D21/326 |
| 7,297,060 B2 * | 11/2007 | Brase et al. | 463/36 |
| D599,413 S * | 9/2009 | Izumi | D21/333 |
| 7,662,042 B2 * | 2/2010 | Oswald | 463/46 |
| 7,699,755 B2 * | 4/2010 | Feldman et al. | 482/8 |
| 2002/0185041 A1 * | 12/2002 | Herbst | 108/25 |
| 2004/0038786 A1 * | 2/2004 | Kuo et al. | 482/130 |

* cited by examiner

US 7,828,157 B2

STEERING WHEEL STAND FOR ELECTRONIC GAME CONTROL

CROSS-REFERENCE TO RELATED APPLICATION

This application claims the benefit of U.S. Provisional Patent Application Ser. No. 60/630,239, filed Nov. 24, 2004.

BACKGROUND OF THE INVENTION

1. Field of the Invention

The present invention relates to support stands, and particularly to a stand for supporting an electronic video game controller including a steering wheel. The mounting of the steering wheel controller on the stand provides a more realistic environment for a person playing a driving video game.

2. Description of the Related Art

Driving simulators are quite common in the field of video games. Arcade style driving video games are often equipped with steering wheels, pedals, gearshifts and, commonly, seats in order to simulate the environment of an actual car and to give a more realistic feel to the driving game.

Home video game systems ordinarily do not include controllers as elaborate as the controllers found in arcade video games. Often, a driving game is played with the more standard thumb-operated controller, or with a joystick. However, some home video game systems do offer steering wheel controllers and pedals, which can be connected to the video game system. Examples of video game systems compatible with driving game accessories include Sony's Playstation® and Microsoft's Xbox®.

Driving game accessories for home video game systems typically include a steering wheel controller and a set of pedals. The steering wheel controller can be set on one's lap, or could be equipped with clamps to secure the controller to a table, while the pedals are set on the floor. Unfortunately, this type of system does not provide the game player with a realistic simulation of being in a car when the user plays the driving video game. Unsecured pedals are highly susceptible to slippage during play, and the edge of the table may hinder movement of the user's arms. Further, a table must be placed in front of the video game monitor, which can be awkward or inconvenient. Thus, a steering wheel stand for an electronic game control solving the aforementioned problems is desired.

SUMMARY OF THE INVENTION

The steering wheel stand for an electronic game control is directed towards the support of a game controller having a steering wheel. The stand provides support of the game controller to position the steering wheel and pedal assembly of the game controller in order to simulate the feel of being in an actual vehicle. Preferably, the steering wheel stand includes a frame formed of hollow tubing that rests on a pair of base legs, which bends toward a user at one end, and which contacts the surface on which the user is seated at the opposite end. The frame is telescopically adjustable to allow for users of different sizes.

Further, the base legs support a pedal plate for the placement of the video game's pedal controls. The pedal plate may be adjusted to be positioned upwardly or downwardly in order to accommodate users of all heights. The steering wheel controls sit on a tray or platform on top of the frame in front of the user.

The steering wheel stand further includes a spring-biased button to detach the base legs from the rest of the frame, wire holders or guides for the video game system's cables, rubber feet to protect the surface on which the steering wheel stand rests, and a back leg for securely positioning the stand against a vertical surface. The back leg further enables the user to selectively position the stand for storage or use.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
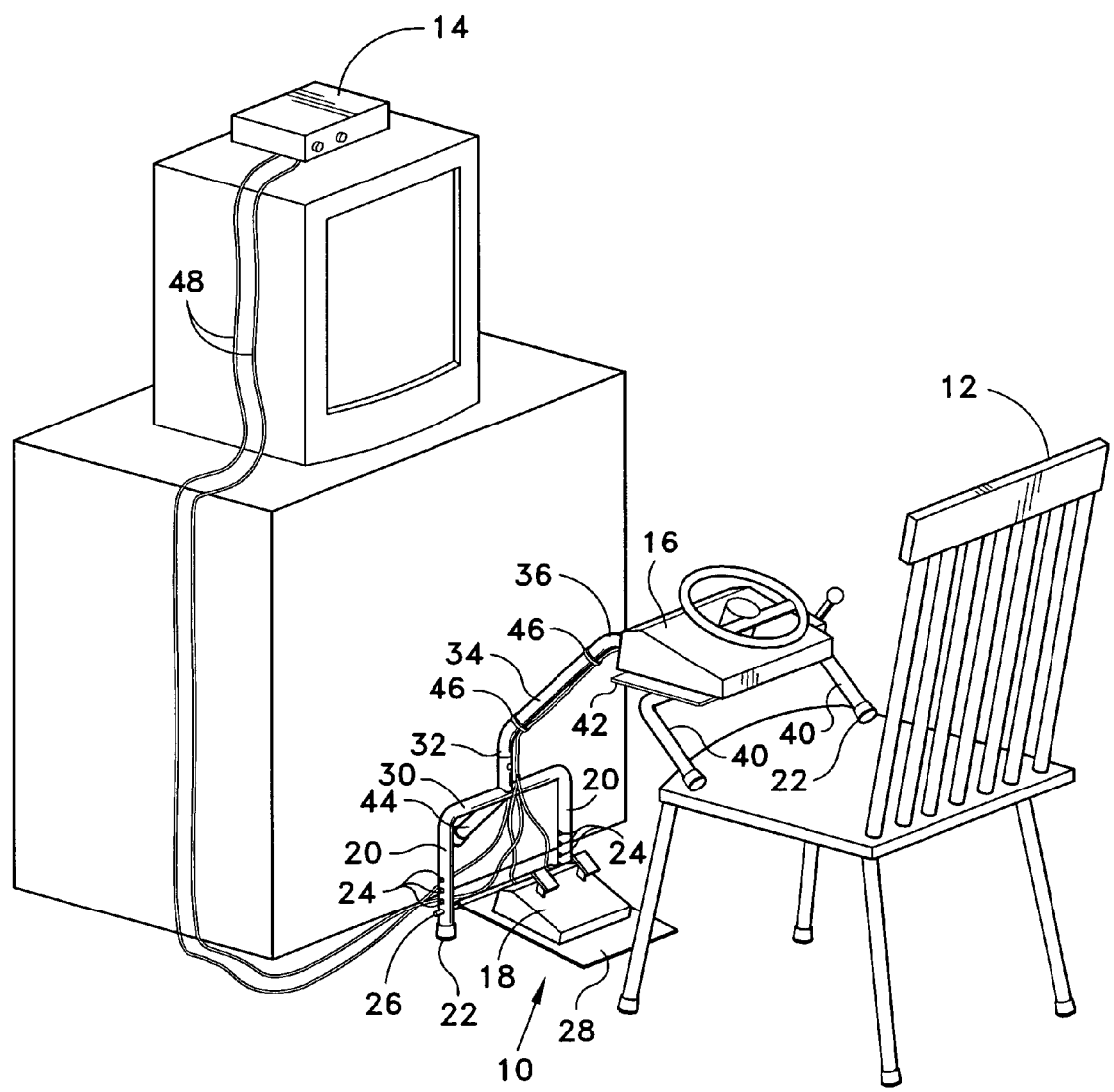
FIG. 1 is an environmental, perspective view of a steering wheel stand for an electronic game control according to the present invention.
Figure 2A:
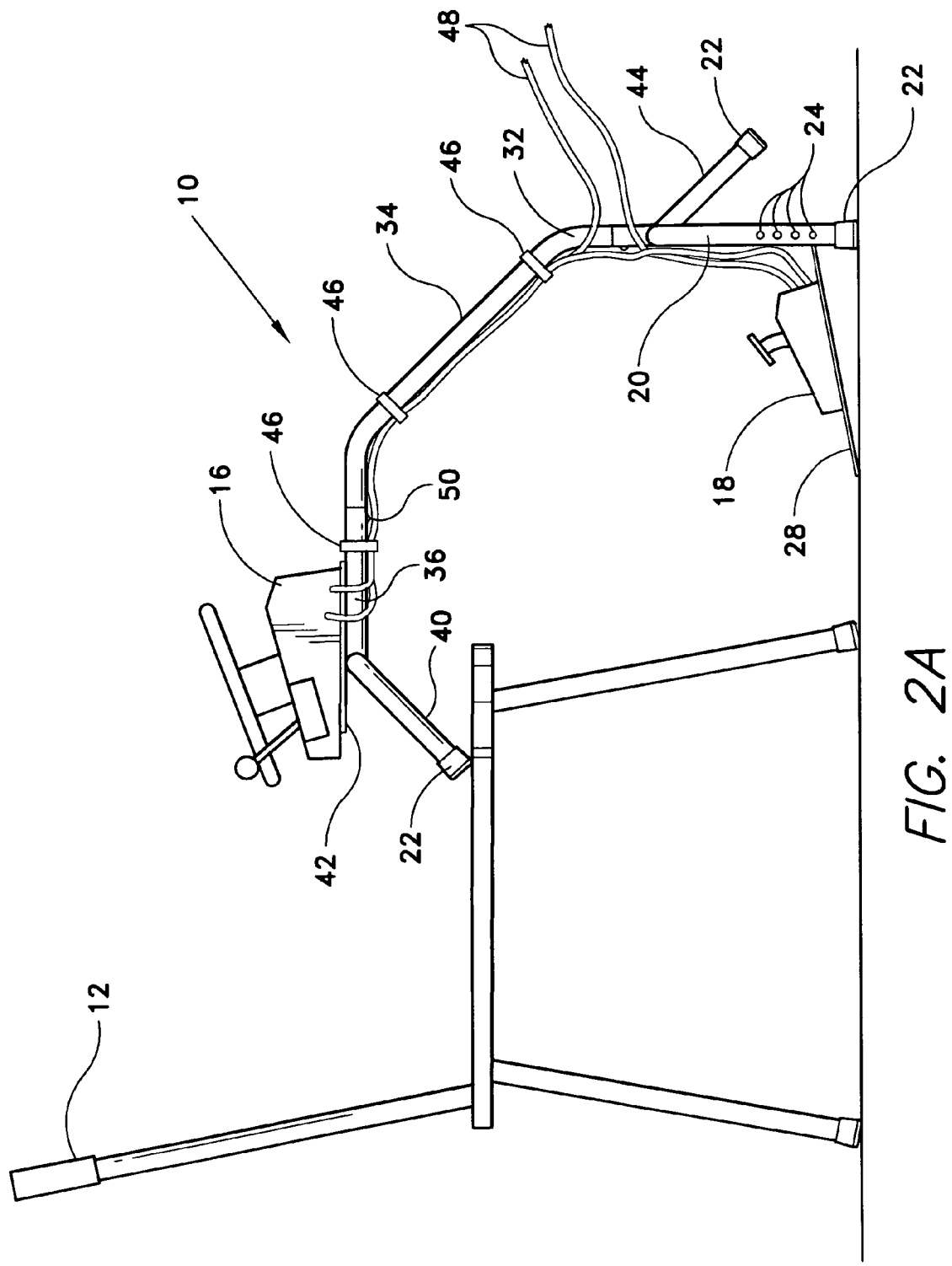
FIG. 2A is an environmental side view of the steering wheel stand of the present invention.
Figure 2B:
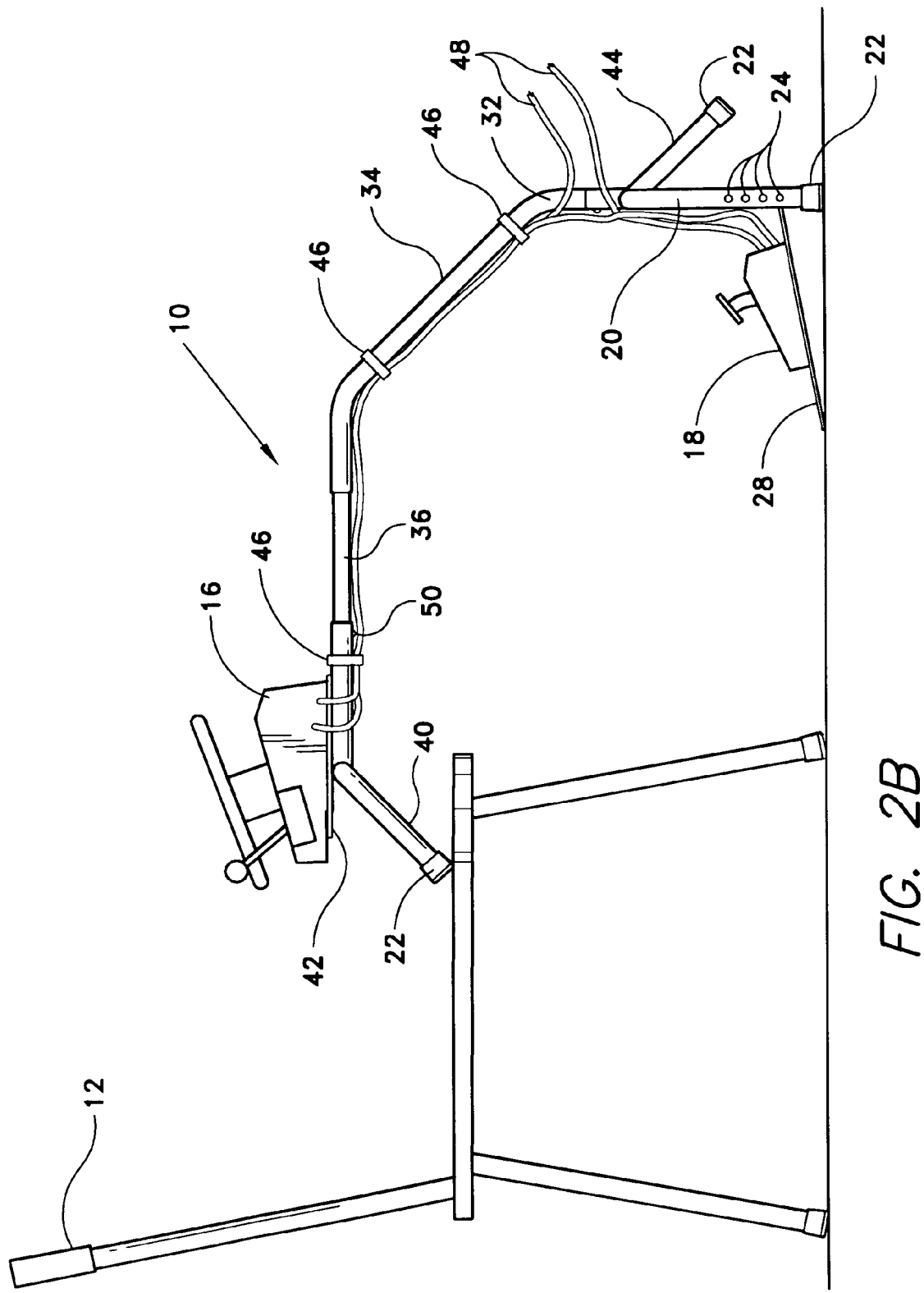
FIG. 2B is an environmental side view of the steering wheel stand of the present invention adjusted to accommodate taller players.
Figure 3:
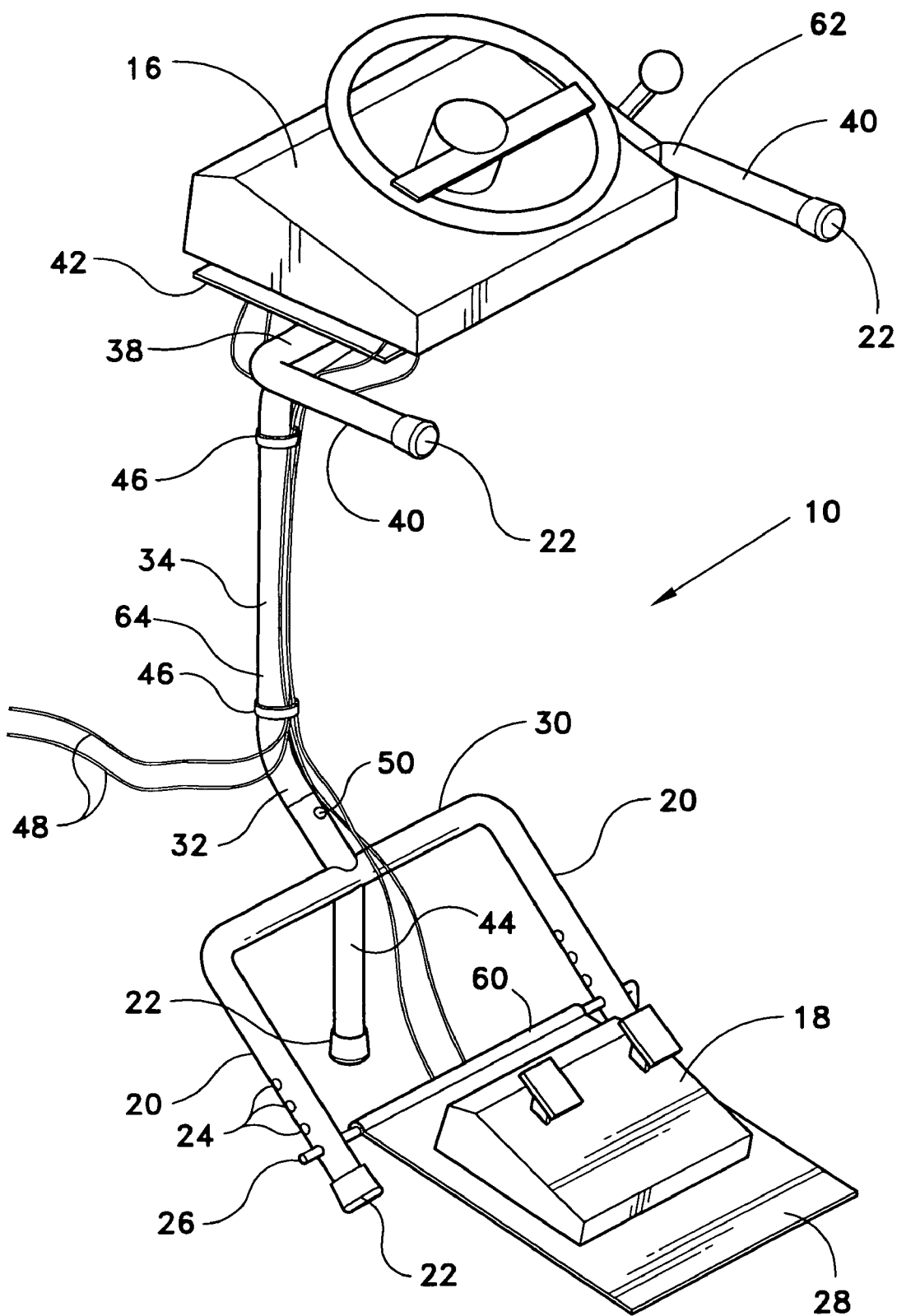
FIG. 3 is a perspective view of the steering wheel stand of the present invention in an upright position.

The present invention is directed towards a steering wheel stand for electronic game control, the stand being referred to generally in the drawings as 10. Referring to FIGS. 1-3, the steering wheel stand 10 is designed to be used in conjunction with a chair 12 or a sofa to create a more realistic feel for a person playing a video game system 14 that uses steering wheel controls 16 and a pedal module 18.

The steering wheel stand 10 includes a pair of base legs 20 that rest on the floor. The base legs 20 may be equipped with rubber feet. Each base leg 20 has a series of apertures 24 positioned so that the apertures 24 are in registry. As shown in FIG. 3, a removable support rod 26 is inserted through aligned apertures 24. The rod 26 supports a pedal plate 28 upon which the pedals 18 are placed, the rod 26 extending through a sleeve 60 extending from a side of the plate 28. The series of apertures 24 and rod 26 24 allow the height of the pedals 18 to be adjusted to accommodate users of different size.

Figure 5:
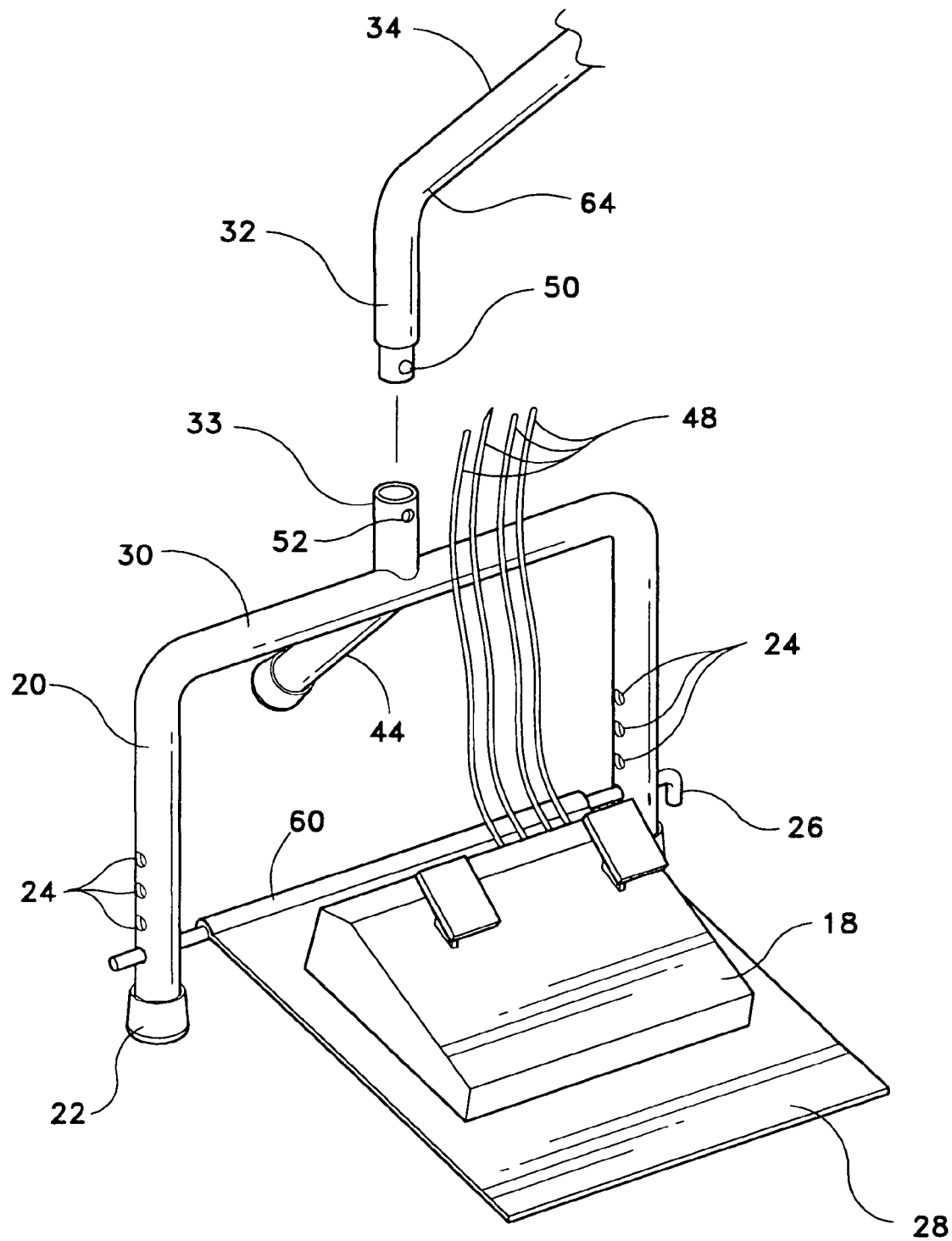
FIG. 5 is a fragmented, partially exploded perspective view of the lower portion of the steering wheel stand of the present invention.

Referring to FIG. 5, a horizontal support bar 30 extends between the base legs 20 and may be formed integrally with legs 20. An upwardly extending central support member 64 is attached approximately in the center of the horizontal support bar 30, the central support member 64 having a lower end, which may be swaged, inserted into a tubular stub 33 extending centrally from horizontal support bar 30 in a direction opposite to legs 28. The central support member 64 is divided into three different sections: a lower section 32, a middle section 34, and an upper section 36, as shown in FIG. 1. The swaged end of the lower section 32 may have a spring detent button 50 that releasably engages a hole 52 defined in stub 33. This detachable construction allows the leg assembly of the steering wheel stand 10 to be detached for convenient storage and transport when not in use.

The middle section 34 joins the lower section 32 at an angle of approximately 135°. Similarly, the upper section 36 joins the middle section 34 at an angle of approximately 135°. The upper section 36 may be telescopically extendable through the use of swaged tubing to accommodate users with different leg lengths. A spring detent button 50 may engage holes in the extended portion of the upper section 36 to secure upper section 36 in place at a desired length.

A U-shaped member 62 is attached to the upper section 36 of the central support member 64, as shown in FIG. 3. The U-shaped member 62 has a crossbar 38, which is attached to the upper section 36, and two arms 40 at either end of the crossbar 38. As shown in FIGS. 1, 2A and 2B, arms 40 extend downward, extending away from the upper section 36 opposite the middle section 34 so that tray 42 is essentially parallel to the ground, the arms 40 being designed to rest on a chair 12 or a sofa, while at the same time straddling a user's legs so that the user has a more realistic experience when playing a driving game. Rubber feet 22 may be attached to the arms 40 to protect the surface on which the arms 40 rest.

A tray 42 or other platform is attached on top of the intersection of the upper section 36 of the central support member 64 and the crossbar 38 of the U-shaped member 62. The tray 42 supports the steering wheel control 16.

Figure 4:
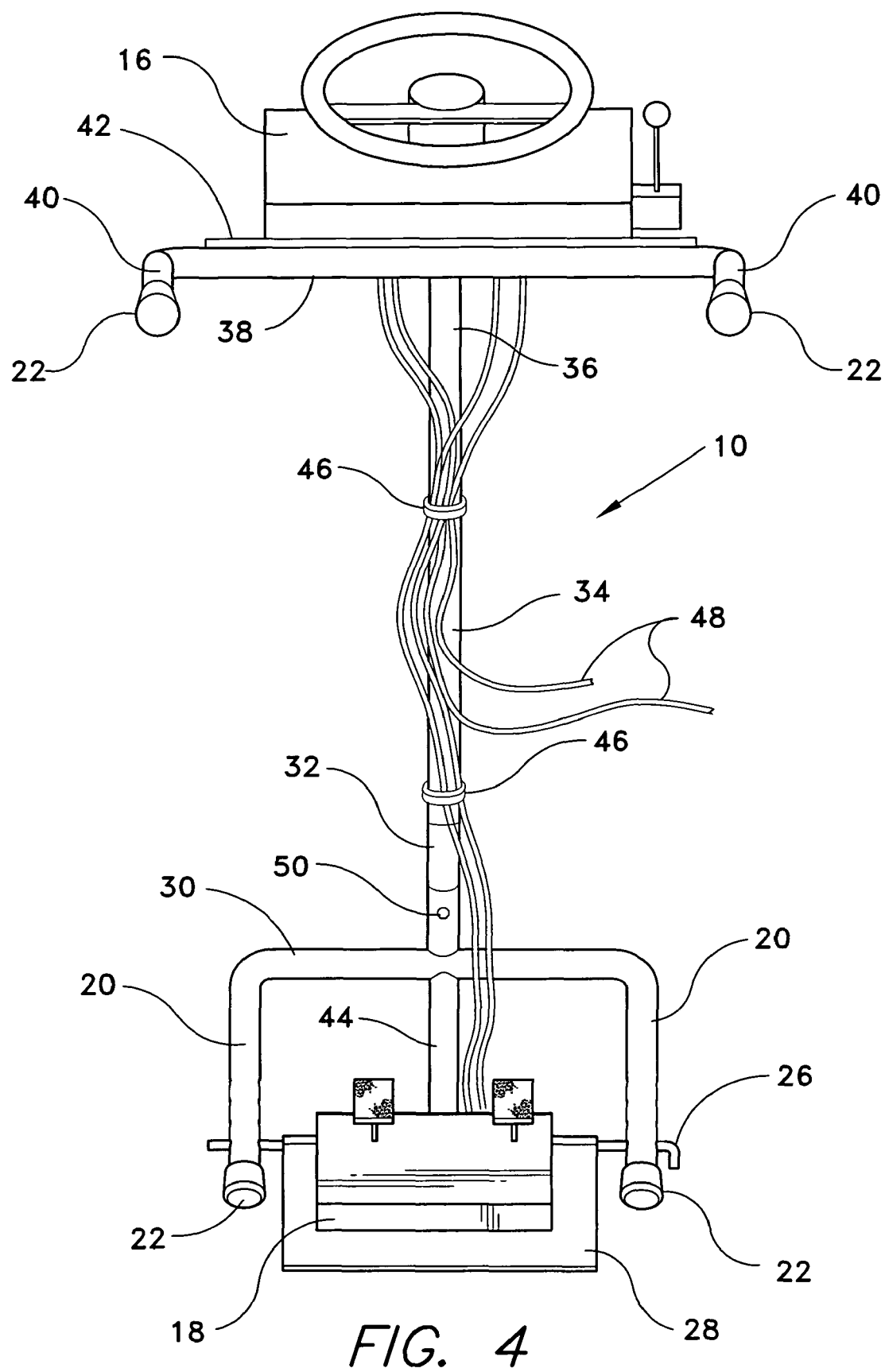
FIG. 4 is a perspective front view the steering wheel stand of the present invention in the upright position.

A further feature of the steering wheel stand 10 is a downwardly extending back leg 44 that is attached to the horizontal support bar 30. By tipping the steering wheel stand 10 so that the back leg 44 rests on the floor, the steering wheel stand 10 may be either stored or used in an upright position, as shown in FIGS. 3 and 4, respectively. A rubber foot 22 may be attached to the back leg 44.

The steering wheel stand 10 may be constructed of a variety of different materials, such as plastic or metals, for example, aluminum. FIGS. 1-5 show the base legs 20, central support member 64 and U-shaped member 62 made of hollow tubing, but other types of material may be utilized, and the tubing may be solid. Other features shown in FIGS. 1-4 include wire holders 46 or guides for securing the cables 48 of the video game system 14.

It is to be understood that the present invention is not limited to the embodiments described above, but encompasses any and all embodiments within the scope of the following claims.

I claim:

1. A steering wheel stand for an electronic game control, comprising:
    a U-shaped leg assembly having a crossbar and a pair of parallel base legs extending from the crossbar, the legs having at least one pair of aligned holes defined therein;
    a pedal platform having at least one sleeve extending therefrom, the pedal platform being adapted for supporting a pedal assembly of the electronic game control;
    a rod removably inserted through a pair of the aligned holes and the sleeve;
    a central support member extending from the crossbar of the U-shaped leg assembly, the support member having two bends forming obtuse angles at opposite ends thereof;
    a U-shaped tray support extending from the central support member opposite the leg assembly, the tray support having a crossbar and a pair of parallel arms extending from opposite ends of the crossbar; and
    a tray attached to the tray support, the tray being adapted for receiving an electronic game controller with a steering wheel.

2. The steering wheel stand as recited in claim 1, wherein each of the bends in said central support member forms an angle of about 135°.

3. The steering wheel stand according to claim 1, wherein the bends in said central support member define an upper section, a middle section, and a lower section.

4. The steering wheel stand according to claim 3, wherein said upper section further comprising a telescoping extension for adjusting the length of the upper section.

5. The steering wheel stand according to claim 3, further comprising a tubular stub extending centrally from the crossbar of said U-shaped leg assembly, the lower section of said central support member having a swaged end detachably received in the tubular stub.

6. The steering wheel stand according to claim 5, wherein said tubular stub has a hole defined therein, the swaged end of the lower section of said central support member further comprising a spring detent button releasably engaging the hole defined in the tubular stub for securing the leg assembly to the central support member.

7. The steering wheel stand according to claim 3, wherein the arms of said U-shaped tray support extend downward from the upper section opposite the middle section in order to maintain the tray in a level position, the arms being adapted for resting on a user's seat straddling the user's legs.

8. The steering wheel stand according to claim 1, further comprising a rubber foot attached to an end of each of the legs for providing traction.

9. The steering wheel stand according to claim 1, further comprising a rubber foot attached to an end of each of the arms.

10. The steering wheel stand according to claim 1, wherein the at least one pair of aligned holes defined in said legs comprises a plurality of pairs of aligned holes disposed along said legs, whereby said pedal platform is adjustable at an angle relative to a surface supporting the legs for accommodating a user's height.

11. The steering wheel stand according to claim 1, further comprising a back leg extending downwardly and rearwardly from the U-shaped leg assembly for supporting the stand in an upright position.

12. The steering wheel stand according to claim 1, further comprising at least one wire holder mounted on said central support member adapted for securing wires of said electronic game controller to said central support member.

13. The steering wheel stand according to claim 1, wherein said leg assembly, said central support member, and said tray support are made of tubular material.

* * * * *